United States Patent [19]

Miyagi

[11] 4,112,678
[45] Sep. 12, 1978

[54] SYSTEM FOR INTRODUCING SECONDARY AIR INTO AN INTERNAL COMBUSTION ENGINE

[75] Inventor: Hideo Miyagi, Susono, Japan

[73] Assignee: Toyota Jidosha Kogyo Kabushiki Kaisha, Toyota, Japan

[21] Appl. No.: 737,667

[22] Filed: Nov. 1, 1976

[30] Foreign Application Priority Data

Jun. 18, 1976 [JP] Japan .................................. 51/70965

[51] Int. Cl.² .............................................. F01N 3/10
[52] U.S. Cl. ......................................... 60/276; 60/289
[58] Field of Search .......................... 60/276, 290, 289

[56] References Cited
U.S. PATENT DOCUMENTS

| | | | |
|---|---|---|---|
| 3,911,674 | 10/1975 | Goto | 60/290 |
| 3,931,710 | 1/1976 | Hartel | 60/290 |
| 3,962,867 | 6/1976 | Ikeura | 60/290 |
| 4,014,169 | 3/1977 | Umino | 60/290 |

Primary Examiner—Douglas Hart
Attorney, Agent, or Firm—Stevens, Davis, Miller & Mosher

[57] ABSTRACT

A system for introducing secondary air into an exhaust system of an internal combustion engine of the carburetor type provided with a three-way catalytic converter in the exhaust system is disclosed. The system includes a flow control valve which has a valve member operated by a vacuum signal in the engine intake system for controlling the amount of secondary air flowing into the engine in accordance with electric signals sent from a λ-sensor which is arranged in an exhaust system of the engine so that the excess air ratio λ of the exhaust gas introduced into the three-way catalytic converter is controlled near 1.0, which is a suitable ratio for the operation of the three-way catalytic converter. The system further includes means for operating the valve member quickly so that the excess air ratio λ is rapidly controlled near 1.0; therefore, an effective cleaning operation of the three-way catalytic converter is expected.

5 Claims, 7 Drawing Figures

SYSTEM FOR INTRODUCING SECONDARY AIR INTO AN INTERNAL COMBUSTION ENGINE

FIELD OF THE INVENTION

The present invention relates to a system for introducing secondary air into an exhaust system of an internal combustion engine of the carburetor type, provided with a three-way catalytic converter arranged in the exhaust system.

BACKGROUND OF THE INVENTION

Already known is a three-way catalytic converter, by which three major toxic components (HC, CO and $NO_x$) in the gas exhausted from an internal combustion engine can be eliminated. The operation of this known three-way catalytic converter is effectively attained when an atmosphere of the exhaust gas introduced into the converter is controlled near stoichiometric atmosphere in which excess air or excess fuel is, substantially not left in the exhaust gas, i.e., the excess air ratio $\lambda$ of the exhaust gas is kept near 1.0.

However, it is impossible to keep the $\lambda$ near 1.0 in a known internal combustion engine, especially, in a carburetor type internal combustion engine; therefore, an effective operation of the three-way catalytic converter is not expected.

To eliminate this drawback, we have already proposed a system for introducing secondary air into an internal combustion engine, provided with a three-way catalytic converter arranged in the exhaust system of the engine, which system comprising a flow control valve having a diaphragm for forming a first chamber and a second chamber one on each side thereof, and which is connected to a valve member for controlling the amount of secondary air (Japanese Patent Application No. 049388/76), corresponding to U.S. Pat. No. 733,167. A vacuum signal is transmitted to the first or the second chamber in order to move the valve member so that the amount of the secondary air is increased or decreased in accordance with the atmosphere of the exhaust gas sensed by a $\lambda$-sensor arranged in the exhaust system, whereby excess air ratio $\lambda$ is controlled near 1.0. The system further comprises delay units for restricting the transmission of the vacuum signal to the first and second chambers, so that the valve member is moved at a controlled rate for preventing a rapid ON-OFF operation of the valve.

SUMMARY OF THE INVENTION

An object of the present invention is to provide a system for introducing secondary air into an exhaust system of an internal combustion engine, in which the excess air ratio $\lambda$ is rapidly controlled near 1.0, in order to obtain an effective operation of a three-way catalytic converter.

According to the present invention, a system is provided for introducing secondary air into an internal combustion engine provided with a three-way catalytic converter arranged in the exhaust system of the engine, said system comprising: a flow control valve having a valve member adapted for controlling the amount of the secondary air introduced into the engine and having a diaphragm which is connected to the valve member and which forms a first control chamber and a second control chamber one on each side of the diaphragm; a first vacuum signal switching valve and a second vacuum signal switching valve, each of which is connected to the corresponding control chamber of the flow control valve and has a first position and a second position, in which first position the corresponding control chamber is opened to a vacuum signal port formed in the engine intake system, in which second position the corresponding control chamber is opened to an atmosphere; a sensor for sensing the excess air ratio $\lambda$ of the exhaust gas in the exhaust system to provide signals indicating said excess air ratio $\lambda$; and an operating unit for switching said first and said second vacuum signal switching valves in accordance with the signals indicating said excess air ratio $\lambda$ in such a manner that said first vacuum signal switching valve is switched to its first position and said second vacuum signal switching valve is switched to its second position when said $\lambda$ is larger than 1.0 to transmit the vacuum signal in the vacuum port to the first control chamber of the flow control valve in order to move the valve member of the flow control valve in one direction allowing the amount of the secondary air to the decreased, and in such a manner that said first vacuum signal switching valve is switched to its second position and said second vacuum signal switching valve is switched to its first position when said $\lambda$ is smaller than 1.0 to transmit the vacuum signal to the second control chamber in order to move the valve member in another direction opposite to said one direction allowing the amount of secondary air to be increased, whereby said excess air ratio $\lambda$ is maintained near 1.0 which is suitable for the operation of said three-way catalytic converter.

According to the invention, the system further comprises means for causing a quick movement of a limited distance in each of said directions, when the switching operations of the first and second vacuum signal switching valves are carried out. As a result of this, the excess air ratio $\lambda$ of the exhaust gas in the exhaust system is quickly controlled to a valve near 1.0, and therefore effective operation of the three-way catalytic converter is expected.

DESCRIPTION OF THE PREFERRED EMBODIMENTS

Figure 1:
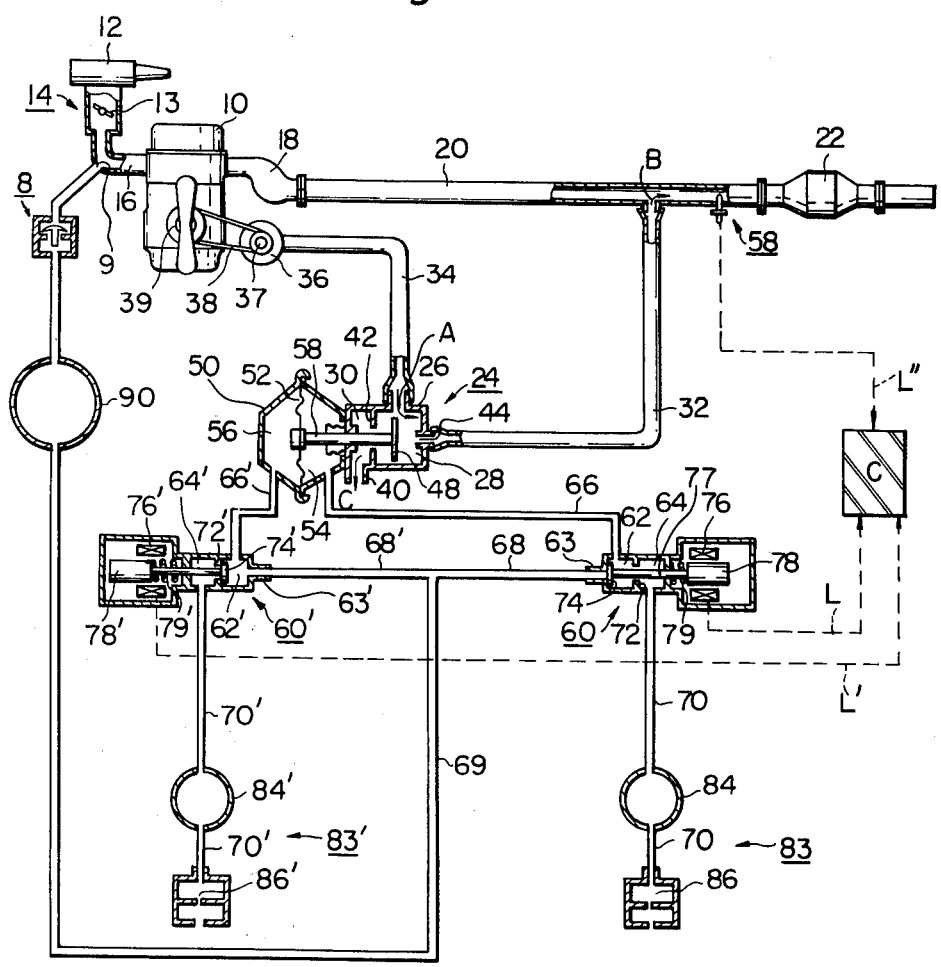
FIG. 1 is a schematic representation of a first embodiment of the present invention.

FIG. 1 indicates a construction of a first embodiment according to the present invention, in which numeral 10 designates an engine body. Intake air is introduced into the combustion chambers (not shown) in the engine body 10, via an air cleaner 12, a carburetor 14 having a throttle valve 13 and an intake manifold 16. A resultant exhaust gas, due to the combustion in each of the combustion chambers, is introduced through an exhaust manifold 18 into an exhaust pipe 20 connected thereto. A three-way catalytic converter 22 is disposed in the exhaust pipe 20.

Numeral 24 designates a flow control valve of a diaphragm type adapted for controlling an amount of secondary air introduced into the exhaust pipe 20 so that the exhaust gas can produce a stoichiometric atmosphere in which no excess air or no excess fuel is left in the exhaust gas, i.e., the excess air ratio λ is kept near 1.0. The flow control valve 24 has a body 26 forming two air chambers 28 and 30. The air chamber 28 is connected to the exhaust pipe 20 through a tube 32 and is connected to an air pump 36 of a vane type through a tube 34. A drive shaft 37 of the air pump 36 is driven by a crankshaft 39 of the engine 10 via a belt 38. The air chamber 30 of the flow control valve 24 is opened to the atmosphere through a port 40.

The flow control valve 24 has a valve member 48 which is arranged between a valve seat 42 communicating the air chamber 28 with the air chamber 30 and a valve seat 44 communicating the air chamber 28 with the tube 32, and has a diaphragm 52 arranged across the interior of a diaphragm casing 50 secured to the body 26 so as to form a first control chamber 54 and a second control chamber 56 on each side thereof, respectively. The diaphragm 52 is connected to the valve member 48 by means of a rod 58, the mid portion of which is slidably supported by the body 26.

Figure 1A:
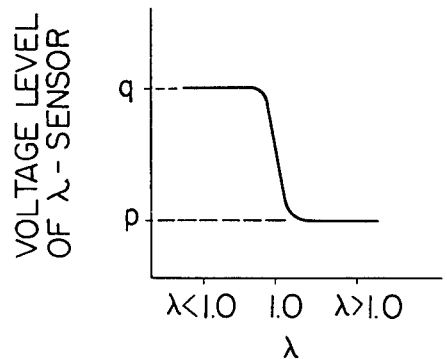
FIG. 1a is a characteristic curve of the $\lambda$-sensor.

Numeral 58 designates a sensor for sensing the atmosphere of the exhaust gas; in other words, for sensing the excess air ratio λ of the exhaust gas in the exhaust pipe 20, for example, by a λ sensor. The λ sensor, which is already known, operates to provide an electrical signal of a low level and of a high level, as shown in FIG. 1a. The first (low) level $p$ indicates that an excess amount of air remains in the exhaust gas in the exhaust gas, in other words, $\lambda > 1.0$. The second (high level) $q$ indicates that an excess amount of fuel remains in the exhaust gas, in other words, $\lambda > 1.0$. In place of the λ-sensor, other types of sensors, for example, a sensor for detecting CO components remaining in the exhaust gas, may be used. In the embodiment indicated in FIG. 1, the λ-sensor 58 is arranged upstream from the catalytic converter 22; however, it is possible to locate the λ-sensor 58 downstream from the catalytic converter 22.

In accordance with the low or high levels of the electrical signal from the λ-sensor 58, a vacuum signal from the engine is transmitted to the first control chamber 54 or to the second control chamber 56 of the flow control valve 24, by a set of electromagnetic valves 60 and 60' fully described hereinafter, in order to decrease or increase the amount of secondary air introduced into the exhaust pipe so that the atmosphere of the exhaust gas introduced into the three-way catalytic converter 22 is controlled near stoichiometric atmosphere in which $\lambda = 1.0$.

Figure 2A:
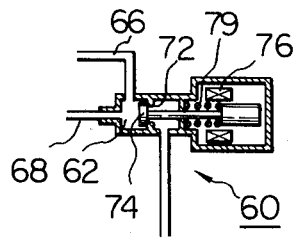
FIGS. 2a and 2b are partial views of FIG. 1, wherein positions of the electromagnetic valves are switched from those of FIG. 1.

The electromagnetic valve 60, which is adapted for switching the transmission of the vacuum signal from the engine to the first control chamber 54 of the flow control valve 24, has two chambers 62 and 64. The chamber 62 communicates with the first control chamber 54 through a conduit 66 and further communicates with a port 9 formed in the intake manifold 16 downstream from the throttle valve 13 through conduits 68 and 69, and a check valve 8. The other chamber 64 communicates with the chamber 62 through a valve seat 72, on which a valve member 74 is rested. The chamber 64 is opened to the atmosphere through the conduit 70 as described fully hereinafter. The valve member 74 is connected to a piece 78 made of a permanent magnetic material, through a rod 77, the middle portion of which is slidably supported on a housing. The piece 78 is inserted into a tubular shape solenoid 76. When the solenoid 76 is not energized, the electromagnetic valve 60 is in a first (or OFF) position, in which the valve member 74 is rested on the valve seat 72 as shown in FIG. 2a, so that the conduit 68 is opened to the conduit 66 under a set force caused by a spring 79 in order to transmit a vacuum signal from the port 9 to the first control chamber 54. When the solenoid 76 is energized as shown in FIG. 1, the electromagnetic valve 60 is switched to a second (ON) position, in which the valve member 74 is moved to close a valve seat 63 against the set force caused by the spring 79, by an electromagnetic force occurring between the piece 78 and the solenoid 76, so that communication between the conduits 66 and 68 is interrupted and further that the conduit 66 is opened to the atmosphere through the conduit 70.

Figure 2B:
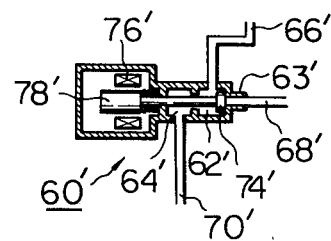

The electromagnetic valve 60', which is adapted for switching the transmission of the vacuum signal from the port 9 to the second control chamber 56 of the flow control valve 24, has substantially the same construction as that of the electromagnetic valve 60. When a solenoid 76' is not energized, a valve member 74' is in a first (OFF) position, in which the valve member 74' is rested on a valve seat 72' under a set force caused by a spring as shown in FIG. 1 in order to cause a vacuum signal from the port 9 to be transmitted through a vacuum conduit 68' which is connected to the vacuum conduit 69 and through the vacuum conduit 66'. When the solenoid 76' is energized, the electromagnetic valve 60' is switched to its second (ON) position as shown in FIG. 2b, in which the valve member 74' is moved, against a set stress of a spring 79', to close a valve seat 63' under the influence of an electromagnetic force acting between the piece 78' and the solenoid 76'. Therefore, communication between the conduit 68' and conduit 66' is interrupted, and the conduit 66' is then opened to the atmosphere through the conduit 70'.

Figure 3:
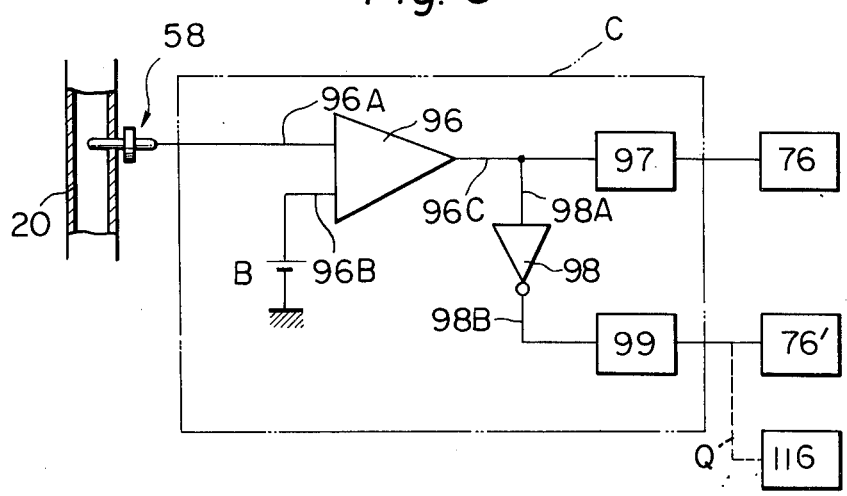
FIG. 3 is a diagrammatic view of the computer in FIG. 1.

In FIG. 1, the solenoids 76 and 76' are connected to a computer c through respective signal lines L and L', to which computer C the λ sensor 58 is connected through a signal line L''. The computer C has, as shown in FIG. 3, a comparator unit 96 including an input $96_A$ connected to the λ-sensor 58, another input $96_B$ connected to a battery $B_1$ and an output $96_C$. The comparator unit 96 operates to provide a pulse at the output $96_C$ when the input level at the input $96_A$ is higher than the input level at the input $96_B$. Whereas, the unit 96 produces no pulse at the output $96_C$ when the input level at the input $96_A$ is lower than the input level at the input $96_B$. The input level at the input $96_B$ due to the battery B is adjusted so that it is lower than said high voltage level $q$ (FIG. 1a) of a signal indicating that $\lambda < 1.0$. Therefore, the comparator 96 provides a pulse at the output $96_C$ when $\lambda < 1.0$, while providing no pulse when $\lambda > 1.0$. The output $96_C$ of the comparator unit 96 is connected through an amplifier unit 97 to the solenoid 76 of the first valve 60, and is further connected to the solenoid 76' of the second valve 60' (shown in FIG. 1) through an inverter unit 98 and another amplifier unit 99. The inverter 98 operates to provide a pulse at the output $98_B$ when no pulse is received at the input $98_A$.

The computer C operates to provide a pulse to energize the solenoid 76, when said high voltage level signal $q$ (FIG. 1a) indicating $\lambda < 1.0$ is received from the λ-sensor 58, in order to increase the amount of secondary air introduced into the exhaust pipe 20, and to provide another pulse for energizing the solenoid 76' when said low voltage level signal p (FIG. 1a) indicating $\lambda > 1.0$ is received from the $\lambda$-sensor 58, in order to decrease the amount of secondary air introduced into the exhaust pipe 20, whereby an atmosphere of the exhaust gas is controlled near stoichiometric atmosphere ($\lambda = 1.0$). This operation will be more fully described hereinafter.

According to the invention, a delay unit 83 (FIG. 1) comprised of an accumulator tank 84 and an orifice 86 is arranged in series in the conduit 70 which is opened to the atmosphere. The tank 84 is adapted for storing an amount of air therein during when the electromagnetic valve 60 is its OFF position, as shown in FIG. 2a. Said amount of air is instantly introduced into the first control chamber 54 of the flow control valve 24 when the valve 60 is switched to its ON position, as shown in FIG. 1, to quickly move the valve member 48 away from the valve seat 44 for a limited distance. The orifice 86 is adapted for introducing an atmospheric air into the tank 84 at a controlled rate when the valve 60 is in its OFF position, as shown in FIG. 2a, and for slowly introducing the atmospheric air into the first chamber 54 after said quick movement of the valve member 48 has been effected in order to again move the valve member 48 slowly in the same direction away from the valve seat 44.

Another delay unit 83' (FIG. 1) comprised of an accumulator tank 84' and an orifice 86' is also arranged on the conduit 70' which is opened to the atmosphere. This tank 84' is adapted for storing an amount of air therein during when the electromagnetic valve 60' is in its OFF position, as shown in FIG. 1, which amount of air is instantly introduced into the second control chamber 56 of the flow control valve when the valve 60' is switched to its ON position, as shown in FIG. 2b, to quickly move the valve member 48 away from the valve seat 42 for a limited distance. The orifice 86' is adapted for introducing atmospheric air into the tank 84' at a controlled rate during the OFF position of the valve 60' and for slowly introducing the atmospheric air into the second control chamber 56 after said quick movement of the valve member 48 is effected.

A vacuum tank 90 is arranged on the conduit 69 upstream from the electromagnetic valves 60 and 60'. This vacuum tank 90 ensures that a vacuum signal of a sufficient level is transmitted toward the first control chamber 54 or second control chamber 56, when the engine is undergoing an accelerating operation, in which the vacuum level at the port 9 is relatively low.

The operation of the apparatus of FIG. 1 is described hereinbelow.

When the excess air ratio $\lambda$ of the exhaust gas in the exhaust pipe 20 is smaller than 1.0, in other words, when excess fuel still remains in the exhaust gas, the $\lambda$-sensor 58 provides an electrical signal of a high voltage level $q$ (FIG. 1a) which is transmitted to the input $96_A$ of the comparator 96 of the computer C, as shown in FIG. 3. Since the voltage level at the other input $96_B$ of the comparator 96 is adjusted so that it is smaller than said voltage level q at the input $96_A$, the comparator 96 therefore provides a pulse at the output $96_C$ in order to energize and cause the solenoid 76 of the first electromagnetic valve 60 to be in its ON position wherein the valve member 74 is rested on the valve seat 63, as shown in FIG. 1. When there is a pulse at the input $98_A$ of the inverter 98 connected to the comparator 96, the comparator 96 does not provide a pulse at the output $98_B$, as shown in FIG. 3, to cause the valve 60' to be maintained in its OFF position in which the valve member 74' is rested on the valve seat 72', as shown in FIG. 1. As a result of this operation of the electromagnetic valves 60 and 60', the first chamber 54 of the flow control valve 24 is opened to the atmosphere through the conduit 66, the chambers 62 and 64, and the conduit 70; whereas, the second chamber 56 is opened to the vacuum port 9 through the conduit 66', the chamber 62' and the conduit 69. Therefore, the diaphragm 52 is caused to move toward the lefthand direction of FIG. 1 by the difference in the pressures between the chambers 54 and 56, whereby the valve member 48 connected to the diaphragm 52 is moved away from the valve seat 44 and towards the valve seat 42. Thus, the amount of the secondary air, which is introduced into the exhaust pipe 20 from the air pump 36 through the tubes 34 and 32, as shown by arrows A and B, is increased due to the fact that the flow resistance between the tubes 34 and 32 is reduced. (In this case, the excess amount of air from the air pump 36 is diverted into the atmosphere through the chamber 30 and the port 40, as shown by arrow C.) Because the amount of the secondary air is being increased, the excess air ratio $\lambda$, which previously was smaller than 1.0, is now controlled near 1.0. When the excess air ratio $\lambda$ of the exhaust gas in the exhaust pipe 20 is larger than 1.0, in other words, when excess air still remains in the exhaust gas, the $\lambda$-sensor 58 provides an electrical signal of a low voltage level $p$ (FIG. 1a) which is transmitted to the input $96_A$ of the comparator 96 (FIG. 3). Since the voltage level at the input $96_B$ is adjusted to be larger than said voltage level $p$ at the input $96_A$, the comparator 96 provides no pulse at the output $96_C$ so that the solenoid 76 of the first valve 60 cannot be energized to cause it to be switched to its OFF position in which the valve member 74 is rested on the valve seat 72, as shown in FIG. 2a. When there is no pulse at the input $98_A$ of the inverter 98 connected to the comparator 96, said inverter 98 provides a pulse at the output $98_B$ which is transmitted, as shown in FIG. 3, through the amplifier unit 99 to the solenoid 76' of the second electromagnetic valve 60', to cause said valve 60' to be switched to its ON position in which the valve member 74' is rested on the valve seat 63, as shown in FIG. 2b. As a result of this operation of the electromagnetic valves 60 and 60', the first control chamber 54 of the flow control valve 24 is now opened to the vacuum port 9 through the conduit 66, the chamber 62, and the conduits 68 and 69p whereas, the second control chamber 56 is opened to the atmosphere through the conduit 66', the chamber 62' and 64', and the conduit 70'. Therefore, the diaphragm 52 is caused to move toward the righthand direction of FIG. 1 by the difference in the pressures between the chambers 54 and 56, whereby the valve member 48 connected to the diaphragm 52 is moved away from the valve seat 42 towards the valve seat 44. Thus, the amount of the secondary air introduced into the exhaust pipe 20 as shown by the arrows A and B is decreased. Further, because the amount of the secondary air is being reduced, the excess air ratio $\lambda$, which was previously larger than 1.0, is now controlled near 1.0.

As is clear from the above-mentioned operation, the amount of the secondary air introduced into the intake pipe 20 is controlled so that the excess air ratio $\lambda$ of the exhaust gas is kept near 1.0. In addition to this operation, according to the present invention, a special operation of the valve member 48 of the flow control valve 24 is expected in order to attain effective control of the λ to reduce the amount of toxic emission from the engine, which special operation will be fully described hereinafter.

When an electrical signal of a high voltage level $q$, indicating that the excess air ratio λ of the exhaust gas in the exhaust pipe 20 is smaller than 1.0 and that excess fuel remains in the exhaust gas, is transmitted to the computer C, the first electromagnetic valve 60 is switched to its ON position (FIG. 1) from its OFF position (FIG. 2a) and the second electromagnetic valve 60' is switched to its OFF position from ON position (FIG. 2b). As a result of this switching operation, the first control chamber 54 is opened to the atmosphere through the conduit 70 and the second control chamber 56 is opened to the vacuum port 9 through the conduits 66', 68' and 69. In this case, the pressure in the second control chamber 56 is instantly dropped to a vacuum level substantially the same as the vacuum level at the vacuum port 9, for example, −400 mmHg; whereas, the pressure in the first control chamber 54 is first increased to a level which is smaller than the atmospheric pressure, for example, −200 mmHg, because an amount of air has been stored in the accumulator tank 84 (FIG. 1) via the orifice 86 (FIG. 1) before the valve 60 has been switched and because said amount of air is instantly introduced into the first control chamber 54 after the valve 60 has been switched so as to increase the pressure level of the chamber 56 to said −200 mmHg. By this difference in the pressure thus formed between the first control chamber 54 (−400 mmHg) and the second control chamber 56 (−200 mmHg), the diaphragm 52 is quickly moved toward the lefthand direction of FIG. 1 to a position in which the force is applied to the diaphragm 52 until the pressures in the chambers 54 and 56 are balanced. Thus, from a time $t_0$ (FIG. 4), the valve member 48 is caused to be quickly moved away from the valve seat 44 and toward the valve seat 42, as shown by the line $Y_0$ of FIG. 4. After this quick movement of a restricted distance, the diaphragm 52 is next slowly moved in the same direction toward the valve seat 42 because the difference in the pressures between the chambers 54 and 56 is gradually increased due to the fact that the air is introduced into the first control chamber 54 via the orifice 86 formed in the conduit, thus causing the valve member 48 to be moved slowly toward the valve seat 42, as shown by the line $Y_1$ in FIG. 4, so that the amount of secondary air introduced into the exhaust pipe 20 is increased.

Figure 4:
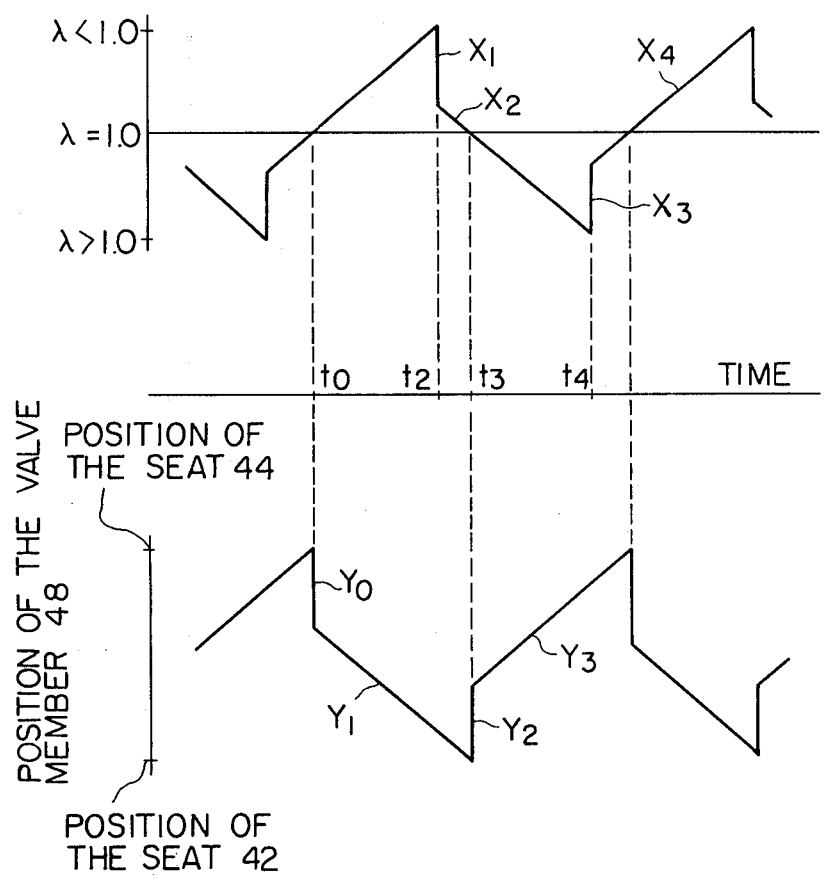
FIG. 4 presents two graphs showing the operation of the system in FIG. 1.

As a result of the increase of the secondary air due to the above-described movement of the valve member 48, at the time $t_2(t_0+T)$, the excess air ratio λ of the exhaust gas, which previously has been smaller than 1.0, in instantly increased to a value near 1.0, as shown by the line $X_1$ in FIG. 4, and said ratio is slowly increased, as shown by the line $X_2$, after said time $t_2$, wherein the time T is a time constant of this apparatus.

When an electrical signal of a low voltage level P, indicating that λ is larger than 1.0 and that excess air still remains in the exhaust gas, is transmitted into the computer C, the first electromagnetic valve 60 is switched to the OFF position (FIG. 2a) from its ON position (FIG. 1) and the second electromagnetic valve 60' is switched to the ON position (FIG. 2b) from its OFF position (FIG. 1). Thus, the first control chamber 54 is opened to the vacuum port 9 through the conduits, 66', 68' and 69 and the second control chamber 56 is opened to the atmosphere through the conduits 66' and 70, to more the valve member 48 toward the righthand direction of FIG. 1. In this case, the pressure in the first control chamber 54 is instantly dropped to a level of vacuum substantially equal to the level at the port 9, for example, 400 mmHg; whereas, the pressure of the second control chamber 56 is first increased to a level which is smaller than the atmospheric pressure, for example, 200 mmHg, determined by the amount of air which has been stored in the tank 84'. Thus, the diaphragm 52 is quickly moved toward the righthand direction of FIG. 1 for a restricted distance. Thus, from a time $t_3$, (FIG. 4), the valve member 48 is caused to be quickly moved away from the value seat 42, as shown by the line $Y_2$ in FIG. 4. After the movement of valve member 48, the diaphragm 12 slowly moves in the same direction, allowing the valve member 48 to be moved slowly toward the valve seat 44 as shown by the line $Y_3$ in FIG. 4. Thereby, the amount of the secondary air introduced into the exhaust pipe 20 is decreased. As a result of the decrease of the secondary air, at a time $t_4$ ($t_3+T$), the excess air ratio λ of the exhaust gas, which has previously been larger than 1.0, is instantly decreased to a value near 1.0 (as shown by the line $X_3$ in FIG. 4) and is gradually decreased as shown by the line $X_4$ after said moment $t_4$.

As is clear from the above control operation of the present invention, the excess air ratio of the exhaust gas is effectively controlled near 1.0 which is suitable for the operation of the three-way catalytic converter 22, due to the fact that the valve member 48 is quickly moved for a limited distance at the moment of activating the switching operation of the electromagnetic valves 60 and 60', the distance of the quick movement being determined by the volumes of the accumulator tanks 84 and 84', the dimensions of the orifices 86 and 86', and the time constant T. Therefore, the excess air ratio λ is quickly controlled near 1.0, and thus effective operation of the three-way catalytic converter 22 can be expected for reducing toxic emission from the engine.

Figure 5:
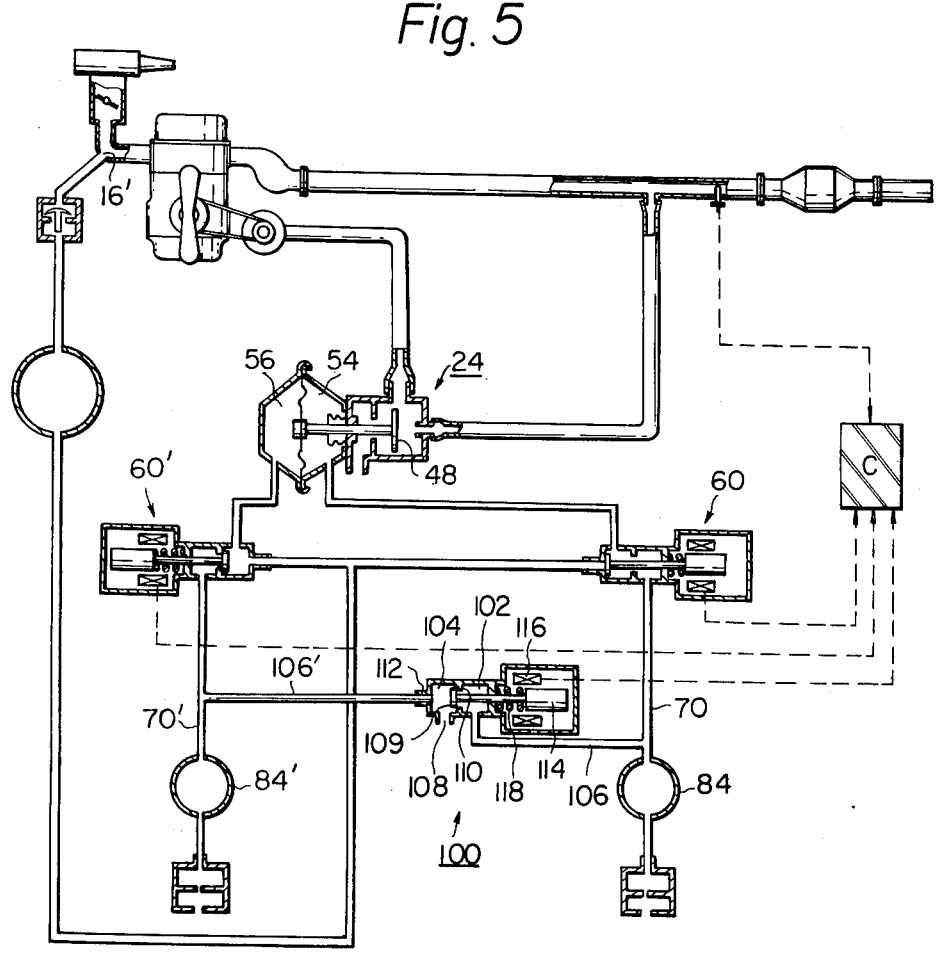
FIG. 5 is a schematic representation of the second embodiment of the present invention.

A second embodiment as shown in FIG. 5 has substantially the same construction as the embodiment in FIG. 1, except that an electromagnetic valve 100 is further included. This electromagnetic valve 100 operates to positively introduce a constant amount of air into the accumulator tank 84' when the second electromagnetic valve 60' is in its OFF position and to positively introduce a constant amount of air into the accumulator tank 84 when the first electromagnetic valve 60 is in its OFF position. The electromagnetic valve 100 has two chambers 102 and 104. The chamber 102 is connected via a conduit 106, to the conduit 70 situated between the first electromagnetic valve 60 and the tank 84. The chamber 104 is connected, via a conduit 106', to the conduit 70' situated between the valve 60' and the tank 84', and the chamber 104 is opened to the atmosphere through the port 108. A valve member 109 is arranged between a valve seat 110 communicating the chamber 102 with the chamber 104 and a valve seat 112 communicating the chamber 104 with the conduit 106'. The valve member 109 is connected to a piece 114 made of a permanent magnetic material, which is inserted to a solenoid 116. When the solenoid 116 is not energized the valve 100 is in a first (OFF) position in which the valve member 109 is rested on the valve seat 110 by the action of a spring 118 so that the accumulator tank 84' is opened to the atmosphere through the conduits 70' and 106', chamber 104 and the port 108. When the solenoid 116 is energized, the valve 100 is in a second (ON)

position in which the valve member 109 is rested on the valve seat 112 by the action of an electromagnetic force existing between the piece 114 and the solenoid 116 so that the accumulator tank 84 is opened to the atmosphere through the conduits 70 and 106, and the chambers 102 and 104. The solenoid 116 should be operated in the same way as that of the second electromagnetic valve 60'. For example, the solenoid 116 may be connected to the amplifier unit 99, as shown in FIG. 3, via a line Q.

In the operation of the second embodiment shown in FIG. 5, a constant amount of air is positively introduced into the tank 84' through the port 109, the chamber 104, and the conduits 106' and 70' when the second electromagnetic valve 60 is in its OFF position due to the electromagnetic valve 100 also being in its OFF position, as shown in FIG. 5. Whereas, a constant amount of air can also be positively introduced into the tank 84 through the port 108, the chambers 104 and 102, and the conduits 106 and 70 when the first electromagnetic valve is in its OFF position because the valve 100, in this case, is switched to its ON position in which the valve member 109 is rested on the valve seat 112.

In this embodiment, a necessary amount of air is positively introduced into the tank 84 or 84'; therefore, a quick movement of the valve member 48 of limited distance during the switching operation of the electromagnetic valves 60 and 60' is always expected, regardless of the engine running condition. Therefore, the excess air ratio is controlled near 1.0 in a desired manner to effectively redure the amount of toxic emission from the engine.

While only two embodiments are described avove, it should be noted that other modifications can be made by those skilled in this field without departing from the scope and essence of the present invention.

What is claimed is:

1. A system for introducing secondary air into an exhaust system of an internal combustion engine provided with a three-way catalytic converter in its exhaust system, which comprises:
    a source of secondary air, a flow control valve between said source and said converter, said valve having a first control chamber and a second control chamber;
    a vacuum signal port in the engine intake system,
    a first vacuum signal switching valve and a second vacuum signal switching valve, means connecting each of said switching valves to the corresponding control chamber of said flow control valve, each of said switching valves having a first position in which the corresponding control chamber is opened to said vacuum signal port, and a second position in which the corresponding control chamber is opened to atmosphere;
    a sensor for sensing and signaling the air-combustion products ratio in the exhaust system;
    an operating unit for switching said first and second vacuum signal switching valves in accordance with the signals from said sensor in such a manner that said first vacuum signal switching valve is switched to its first position and said second vacuum signal switching valve is switched to its second position when there is an excess air being fed to the converter to transmit the vacuum signal from said vacuum port into said first control chamber of said flow control valve in order to move the valve member thereof in one direction allowing the amount of the secondary air to be decreased, and in such a manner that said first vacuum signal switching valve is switched to its second position and said second vacuum signal switching valve is switched to its first position when lack of air reaches a predetermined value to transmit the vacuum signal into the second control chamber in order to move the valve member in another direction opposite to said one direction allowing the amount of secondary air to be increased, and;
    means for causing a quick movement of said valve member within a limited distance in each of said directions at the moment when said switching operation of the first and second vacuum signal switching valves is carried out, so that said excess air ratio $\lambda$ is rapidly controlled to be near 1.0, which is suitable for the operation of the three way catalytic converter.

2. A system for introducing secondary air according to claim 1, wherein said means comprises:
    a first conduit means and a second conduit means each of which is adapted for connecting the corresponding vacuum signal switching valve with the atmosphere;
    a first accumulator tank and a second accumulator tank of predetermined volumes, each of which is arranged on the corresponding conduit means, and;
    a first orifice and a second orifice of predetermined dimensions, each of which is arranged on the corresponding conduit means remote from the corresponding vacuum signal switching valve, whereby an amount of air is stored in the corresponding accumulator tank when the corresponding vacuum switching valve is in its first position, which amount of air is introduced into the corresponding control chamber of said flow control chamber, when the corresponding vacuum switching valve is switched to its second position, causing said quick movement of the valve member to be effected.

3. A system according to claim 1, wherein said flow control valve includes a diaphragm connected to said valve member, which diaphragm forms, on one side thereof, said first control chamber, and on the other side thereof, said second control chamber.

4. A system for introducing secondary air according to claim 2, wherein said means further comprises valve means for opening each of said conduit means between the corresponding vacuum signal switching valve and the corresponding accumulator tank with an atmosphere when the corresponding vacuum signal switching valve is in its first position, whereby a constant amount of air positively introduced into the corresponding accumulator tank.

5. A system for introducing secondary air according to claim 4, wherein said valve means comprises an electromagnetic valve operated by said signal from said sensor in such a manner that the first conduit means is opened to the atmosphere when said $\lambda$ is larger than 1.0, whereas the second conduit means is opened to the atmosphere when said $\lambda$ is smaller than 1.0.

* * * * *